United States Patent [19]

Hirohata

[11] Patent Number: 4,603,458
[45] Date of Patent: Aug. 5, 1986

[54] ROLLER SUPPORTED BY A PNEUMATIC BEARING

[75] Inventor: Nobuyuki Hirohata, Yakayama, Japan

[73] Assignee: Sanko Kikai Co., Ltd., Wakayama, Japan

[21] Appl. No.: 711,208

[22] Filed: Mar. 13, 1985

[30] Foreign Application Priority Data

Sep. 14, 1984 [JP] Japan .................. 59-193660

[51] Int. Cl.$^4$ .................. B21B 31/08; B21B 27/00; B60B 7/04
[52] U.S. Cl. .................. 29/130; 29/116 R; 29/132; 384/101
[58] Field of Search .................. 29/130, 116, 116 AD, 29/113 R, 113 AD, 121.8, 131, 132; 308/DIG. 11, 1 R; 384/100, 101

[56] References Cited

U.S. PATENT DOCUMENTS

| | | | |
|---|---|---|---|
| 2,708,763 | 5/1955 | Jacoby | 29/131 |
| 3,349,462 | 10/1967 | Mott | 29/116 R |
| 3,397,439 | 8/1968 | Hanau | 29/116 R |
| 3,657,782 | 4/1972 | Mott | 29/116 R X |
| 4,266,660 | 5/1981 | Herman | 29/130 X |
| 4,416,201 | 11/1983 | Kessler | 29/130 X |

Primary Examiner—Howard N. Goldberg
Assistant Examiner—Irene Golabi
Attorney, Agent, or Firm—Wenderoth, Lind & Ponack

[57] ABSTRACT

A roller used for a roller conveyor which includes an outer cylinder of the roller supported by a pneumatic bearing. The roller also includes a fixed shaft having a path for letting air pass through in the center thereof, and annular members fitted on the fixed shaft, the outer cylinder covering the shaft and annular members leaving a narrow gap around the annular members. The path for letting air pass through the shaft and the narrow gap communicate with each other by way of holes and a groove made on the annular members. Therefore, the introduced air can pass through the holes and the groove and then fill the narrow gap to such an extent that the wall of the outer cylinder never comes into contact with the annular members, the thin layer of air in the gap functioning as the pneumatic bearing.

9 Claims, 6 Drawing Figures

ROLLER SUPPORTED BY A PNEUMATIC BEARING

BACKGROUND OF THE INVENTION

This invention relates to a roller whose outer cylinder is designed to rotate supported by a thin layer of air which works as a pneumatic bearing.

In a conveyor for carrying such comparatively light products as sheets, films, plates and the like, a row of rollers supported in a frame at a certain spacing is used; these rollers are not driven by power but by the feed of products.

Incidentally, an outer cylinder of such conventional rollers is supported by a bearing; however, in order to rotate the rollers, a relatively large moment is required at first in order to overcome the resistance originating therefrom. Therefore, there appears a lag in the rotation of rollers relative to the movement of goods just fed on a conveyor especially when the goods are comparatively light products such as sheets, films, plates, etc. which do not have enough moment to rotate the rollers. As a consequence, slippage occurs between the goods and the rollers, which tends to scratch the goods, especially when they are mirror-finished or printed, and deteriorate their merchandise value. In addition, such structure as the outer cylinder of the rollers is supported by a bearing and needs frequent checks and maintenance.

Under these circumstances, the present inventors have keenly studied to eliminate the drawbacks of the conventional rollers and finally accomplished the present invention.

It is an object of the present invention to provide a roller whose initial resistance to rotation is so little that there arises virtually no slip between goods fed on a conveyor and the surface of the roller. It is another object of the present invention to provide a roller whose performance does not decline so much as to require periodic checks and maintenance.

BRIEF DESCRIPTION OF THE DRAWINGS

The above and other objects and features of this invention will appear more fully hereinafter from a consideration of the following description taken in connection with the accompanying drawing wherein one example is illustrated by way of example.

DETAILED DESCRIPTION OF THE PREFERRED EMBODIMENT

Figure 1:
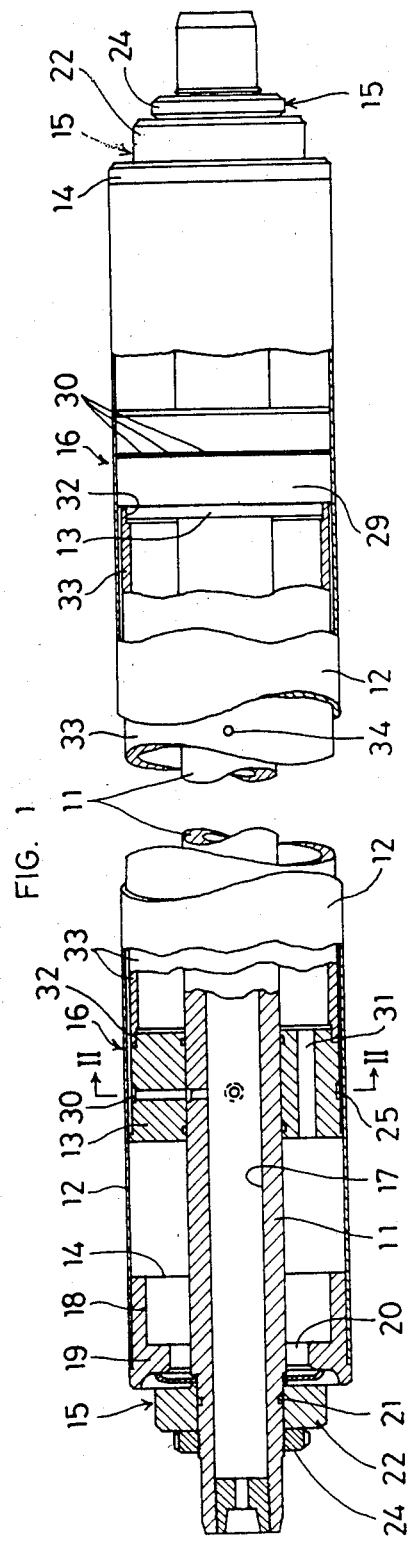
FIG. 1 is a partially cutaway front view of a roller of this invention.
Figure 2:
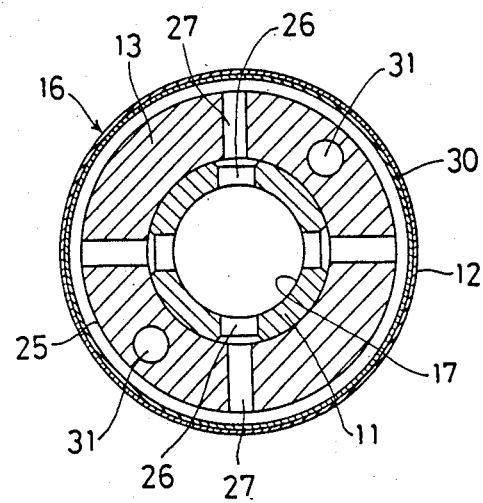
FIG. 2 is a cross-sectional side view of the same roller taken on the line II—II in FIG. 1.

As shown in FIG. 1, the present roller is constructed of a fixed shaft 11, an outer cylinder 12 fitted on the outside of the fixed shaft 11, a plurality of annular members 13 attached to the fixed shaft 11 inside the outer cylinder 12, rings 14 for preventing distortion of the cylinder 12 attached to both ends of the cylinder and an air flow regulator 15 attached to both ends of the shaft 11, whereby a pneumatic bearing 16 is formed between the annular member 13 and the inside of the outer cylinder 12.

The axis of the fixed shaft 11 provides compressed air a path to pass through from at least one of the ends to the other, wherein both the ends of the fixed shaft are held by means of a casing in such a way that it is held in a horizontal position.

The outer cylinder 12 is made of a metal pipe whose wall is very thin; for example, a nickel pipe with a wall of thickness about 100 microns which is manufactured through the electroforming process is employed for this aim in view of both its strength and the reduction of its weight.

Both the rings 14 are constructed of a cylinder 18 which is fitted into the outer cylinder 12 and stuck thereto with an adhesive and a flange 19 which inwardly projects from the wall of the cylinder 19 in the radial direction; the rings 14 have such structure that the cylinder 18 serves to keep the shape of the cylinder 12 from distortion and the flange 19 provides around the fixed shaft 11 an annular space for permitting air to flow out.

The air flow regulator 15 has an adjusting means for keeping the air pressure constant inside the outer cylinder in order to control the amount of air liberated into the atmosphere.

Figure 5:
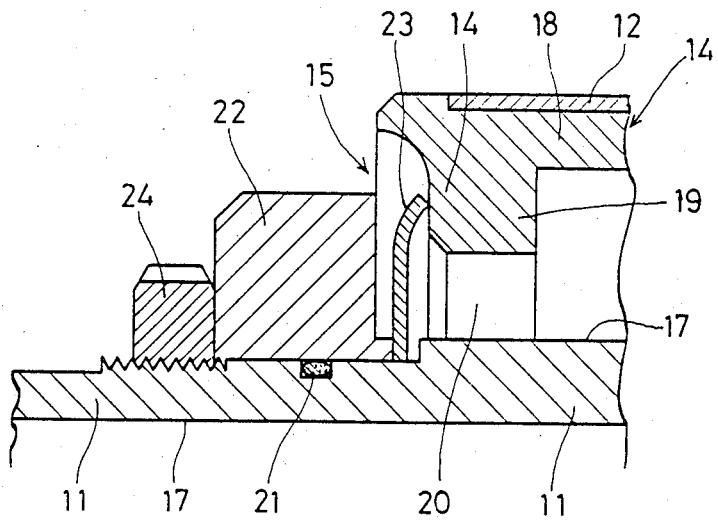
FIG. 5 is a cross-sectional front view of an air flow regulator of the same roller.
Figure 6:
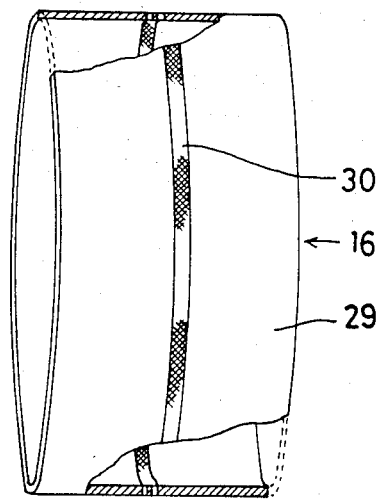
FIG. 6 is an enlarged front view of a porous sheet material attached to the same roller.

As shown in FIG. 5, the adjusting means has a ring 22 on the end of the fixed shaft 11. The ring 22 is fitted on the fixed shaft 11 air-tightly by means of an O-ring provided on the fixed shaft 11 so as to be slidable freely. A valve plate 23 is disposed between the two rings 14, 22; it is made of bronze and other materials and shaped into a ring whose periphery is normally pressed against the ring 14 but released from the compression when put into and during operation.

A nut 24 is screwed on the fixed shaft 11 outside the ring 22 to adjust the position of the ring 22; however, the nut may be replaced with anything else if it is suitable for this aim.

The position of the air flow regulator 15 is adjustable on the fixed shaft 11 so as to vary the distance to the ring 14 in order to set the amount of air getting out from the inside of the outer cylinder 12; at the same time, the air flow regulator plays a role of a pneumatic bearing in the thrust direction to the outer cylinder 12.

The annular members 13 are fitted on the fixed shaft 11 air-tightly; an annular groove 25 provided around the annular members 13 communicate with the central air path of the fixed shaft 11 by way of holes 26, 27 pierced in the radial direction, so that the annular groove 25 is filled with a compressed air.

Figure 3:
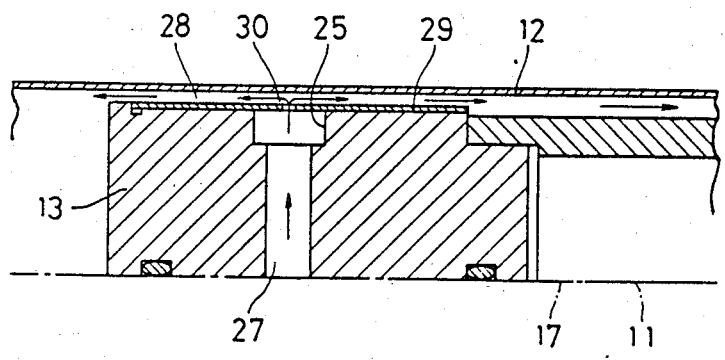
FIG. 3 is a partial enlarged cross-sectional front view of a pneumatic bearing of the same roller.
Figure 4:
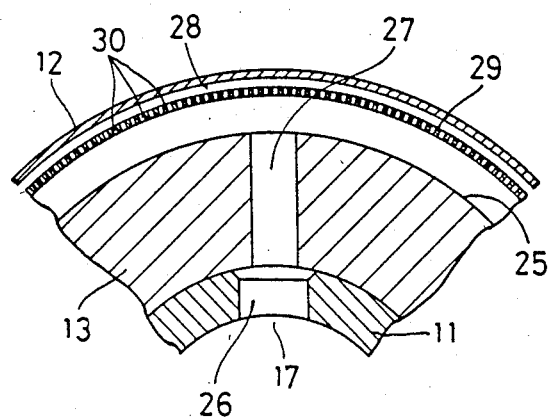
FIG. 4 is a partial enlarged cross-sectional side view of the pneumatic bearing of the same roller.

As seen from FIGS. 1 and 3, the outer diameter of the annular members is made a little smaller than the inside diameter of the outer cylinder 12 so as to give outside of the annular members a cylindrical air layer 28 of thickness about 15 microns.

The air jetting out of the annular groove fills the cylindrical thin space 28 and supports the wall of the outer cylinder with its pressure from the inside; as a result, there forms a pneumatic bearing 16 beneath the outer cylinder 12.

Consequently, the inside of the outer cylinder 12 does not get in direct contact with the annular members 13; therefore, the outer cylinder alone can rotate freely without receiving resistance.

A porous sheet material 29 is stuck on the outside of the annular members 13 in order that the compressed air jetting from the annular groove 25 may prevail over the cylindrical space uniformly.

To meet this objective, the porous sheet material can be composed of a mesh having a porosity of about 2–14% or, as shown in the figures, fine holes 30 can be formed only on the portion of the porous sheet material 29 covering the annular groove 25. In addition, a path for letting air flow toward both ends of the roller inside the outer cylinder is formed through holes 31 in the annular members 13 in the axial direction of the fixed shaft 11.

The number of the annular members 13 may be decided appropriately in accordance with the length of the outer cylinder 12; besides, the outer cylinder may be divided into plural parts so as to cover the fixed shaft 11 altogether in series.

As shown in FIG. 1, an annular step 32 is provided on the peripheral surfaces of the annular members 13 on both sides in such a way that a pipe 33 made of aluminium or the like can be fitted on it. By making the space 28 between the wall of the outer cylinder 12 and the pipe 33 as narrow as possible, a thin layer of air flowing therein works effectively so much as to prevent the distortion of the outer cylinder 12.

Since holes 34 are pierced in the wall of the pipe 33, the air flowing in the space flows into the pipe 33 via the holes 34 and is then liberated into the atmosphere by way of the air flow regulator 15 attached to both ends of the fixed shaft 11 so as to adjust the inside pressure.

The roller of the present invention has such structure and function that a roller conveyor can be made up by assembling a series of them in frame in a row with a certain spacing.

Compressed air is introduced into the central air path 17 by way of a duct connected to an end of each shaft 11. The air fills the annular groove 25 after having passed through the holes 26, 27, then penetrates the porous sheet material 29 and finally flows into the space 28 between the annular members 13 and the wall of the outer cylinder 12, as shown by the arrows in FIG. 3, whereby there appears a certain pressure distribution which serves to keep the outer cylinder 12 out of contact with the annular members 13 and allows the outer cylinder to freely rotate without suffering any resistance as goods are fed on the conveyor. Incidentally, the air flowing out two ways from the annular member 13 fills the space beneath the outer cylinder; at the same time, it causes the pressure on the outside of both the annular members 13 to be uniform. Finally, the air is purged out from both ends of the outer cylinder by the adjustment of the distance between the ring 14 and the air flow regulator 15; thus, the air pressure distribution is maintained constant around the annular members 13 by means of the air flow regulator;

As best seen from the above, inasmuch as the outer cylinder remains entirely separated by a jet of air, the rotation of the outer cylinder gives rise to very little resistance. As a consequence, even though goods fed on a conveyor are very light products like sheets, films or plates, the outer cylinder is driven by their feed so freely that there arises no slip in their conveyance, which guarantees that they will not to be scratched.

What is claimed is

1. A roller comprising:

a fixed shaft having a longitudinally extending central axis and a longitudinally extending central passage for directing air longitudinally therethrough;

an outer cylinder having a thin wall having a cylindrical inner surface, covering said fixed shaft in radially spaced relation thereto, to prevent distortion of said outer cylinder;

annular members fastened to said fixed shaft, having peripheral surfaces spaced from the inner surface of said outer cylinder so as to define very narrow gaps therebetween in fluid communication inside said outer cylinder with both of said opposite ends of said outer cylinder, said annular members having annular grooves on said peripheral surfaces, said shaft and said annular members having holes therein providing fluid communication between said annular groves and said central passage;

a flow regulator means for adjusting an amount of air flowing out of both of said opposite ends of said outer cylinder; and means, including porous sheet material in said gap surrounding said peripheral surfaces of said annular members, for distributing air jetting from said annular groove into said gaps with even pressure distribution in said gaps, whereby the air in said gaps defines air bearings rotatively supporting said outer cylinder.

2. A roller as in claim 1, wherein said outer cylinder is made of nickel and said thin wall has a thickness about 100 microns.

3. A roller as in claim 1, wherein said flow regulator comprises adjusting means for keeping the air pressure constant inside said outer cylinder.

4. A roller as in claim 1, further comprising a pipe fitted on the annular members in steps provided on said annular members such that said pipe is separated from said cylindrical inner surface of said thin wall of said outer cylinder by a very narrow gap, said pipe having a plurality of holes therein.

5. A roller as in claim 1, further comprising support rings disposed inside of and attached to said opposite ends of said outer cylinder for preventing distortion of said outer cylinder, wherein said flow regulator means includes valve plates fixed to said shaft at said opposite ends of said outer cylinder and resiliently pressed against said support rings.

6. A roller as in claim 1, further comprising a longitudinally extending pipe inside and concentric with said outer cylinder, surrounding said shaft in spaced relation thereto between and connecting said annular members, said pipe being narrowly spaced from said cylindrical inner surface to define a narrow cylindrical space in fluid communication at opposite longitudinal ends thereof with said gaps, and having holes therein providing fluid communication between the space between said shaft and said pipe and said narrow cylindrical space.

7. A roller as in claim 6, wherein said annular members have longitudinally extending holes communicating at opposite ends thereof with one of said opposite ends of said outer cylinder and said space between said shaft and said pipe.

8. A roller as in claim 7, wherein said pipe is fitted at opposite ends thereof in annular steps formed in said annular members at said cylindrical peripheral surfaces.

9. A roller as in claim 6, wherein said pipe is fitted at opposite ends thereof in annular steps formed in said annular members at said cylindrical peripheral surfaces.

* * * * *